United States Patent Office 3,751,372
Patented Aug. 7, 1973

3,751,372
SCALE AND CORROSION CONTROL IN CIRCU-
LATING WATER USING POLYPHOSPHATES
AND ORGANOPHOSPHONIC ACIDS
David C. Zecher, Newark, Del., assignor to Hercules
Incorporated, Wilmington, Del.
No Drawing. Filed June 18, 1971, Ser. No. 154,592
Int. Cl. C02b 5/00, 5/04, 5/06
U.S. Cl. 252—181  12 Claims

ABSTRACT OF THE DISCLOSURE

Provides a composition and method for conditioning circulating water to reduce corrosion and/or scale accumulation on metal. The composition includes (1) certain water soluble in organic polyphosphates or their corresponding acids or (2) phosphorylated polyols together with (3) certain water soluble organophosphonic acids or their corresponding salts. Component (3) synergistically increases the efficiency of components (1) and (2). The method includes introducing the components into the water periodically, but preferably continuously, either separateely or in combination.

---

The present invention relates to a composition and method for conditioning water, and more particularly for conditioning flowing or circulating water streams (e.g. as used in cooling water systems or evaporators for aqueous solutions) to reduce the corrosive attack and/or scale accumulation on metal surfaces which the water contacts.

Cooling waters are used in many industrial processes to remove heat. Most waters used for this purpose contain dissolved solids which tend to form insoluble deposits (i.e. scale) on metal surfaces which they contact, particularly the metal components of heat exchangers.

Among the most effective and widely used corrosion and scale inhibitors at present are formulations based on chromium compounds in the hexavalent oxidation state, e.g. the chromates and dichromates of sodium, potassium and zinc. However, chromium-based inhibitors have several disadvantages, among the most serious of which are toxicity, staining, and incompatibility with reducing agents (e.g. $H_2S$ and $SO_2$) often present in the air drawn through cooling towers. Recently there has been a substantial increase in demand for non-chromate nontoxic corrosion and scale inhibitors. Among the non-chromate nontoxic corrosion and scale inhibitors, polyphosphates including more specifically inorganic polyphosphates have been used and more recently polyfunctional acid phosphate esters of polyols (i.e. phosphorylated polyols); however, both of these nonchromate classes of polyphosphates are generally less efficient corrosion and scale inhibitors than those containing chromate, hence there is a substantial need for increasing their efficiency.

According to the present invention it has been found that certain water soluble organophosphonic acids and their salts synergistically increase the efficiency of certain water soluble polyphosphates, as hereinafter defined, as corrosion and scale inhibitors.

The term "synergistic" is used herein in its usual sense to mean that the reduction in corrosion and/or scale deposition under a given set of circumstances using the combination of the present invention (i.e. organophosphonic acid plus polyphosphate) is substantially greater than the sum of the corrosion and/or scale deposition results obtained using the organophosphonic acid alone plus that obtained using the polyphosphate alone.

Unless otherwise indicated as used herein the term polyphosphates means (1) inorganic polyphosphates, (2) phosphorylated polyols, and (3) the corresponding acids of (1), and the term inorganic polyphosphates means inorganic polyphosphates and their corresponding acids.

Unless otherwise indicated as used herein the term organophosphonic acids means organophosphonic acids and their corresponding salts.

Polyphosphates applicable herein are (1) an inorganic polyphosphate having a molar ratio of at least one of alkali metal oxide, alkaline earth metal oxide, zinc oxide to $P_2O_5$ of about 0.4/1–2/1, and their corresponding acids having a molar ratio of water to $P_2O_5$ of about 0.4/1–2/1,
(2) a polyfunctional acid phosphate ester of polyhydric alcohol, said ester having the formula $R(OPO_3H_2)_x$ wherein R is the hydrocarbyl group of a polyhydric alcohol (i.e. R is any remaining organic residue of a polyhydric alcohol used as the starting material) and $x$ is a number from 2 to 6, said esters often being referred to in the art as phosphorylated polyols.

Applicable water soluble inorganic polyphosphates include for instance any of the water soluble glassy and crystalline phosphates, e.g. the so-called molecularly dehydrated phosphates of any of the alkali metals, alkaline earth metals, and zinc, as well as zinc-alkali metal polyphosphates (e.g. the compound commercially available as "Calgon TG" which is substantially sodium hexametaphosphate containing about 8% zinc), and mixtures thereof. The claims herein are also intended to include said mixtures. Included also are the acids corresponding to these polyphosphate salts, e.g. pyrophosphoric acid ($H_4P_2O_7$) and higher phosphoric acids having a molar ratio of water to $P_2O_5$ of about 0.4/1–2/1. Examples of particular inorganic polyphosphate compounds applicable include the pyrophosphates (e.g. tetrapotassium pyrophosphate and pyrophosphoric acid), the tripolyphosphates (e.g. sodium tripolyphosphate), the hexametaphosphates (e.g. sodium hexametaphosphate).

Preferred polyhydric alcohols (e.g. polyols) include ethylene glycol, 1,3-propane diol, glycerol, trimethanolethane, pentaerythritol, and mannitol.

A number of processes are known in the art for preparing the phosphorylated polyols. A preferred process is to react polyphosphoric acid with a polyol. The polyphosphoric acid should have a $P_2O_5$ (i.e. phosphorus pentoxide) content of at least about 72%, preferably about 82% to 84%. A residue of orthophosphoric acid and polyphosphoric acid remains on completion of the reaction. This residue may be as high as about 25%–40% of the total weight of the phosphorylated polyol. It may either be removed or left in admixture with the phosphorylated polyol. Preferably the phosphorylated polyols produced by this process are prepared employing amounts of a polyphosphoric acid having about 0.5–1 molar equivalents of $P_2O_5$ for each equivalent of the polyol used. Larger amounts of polyphosphoric acid can be used if desired. By "equivalent of the polyol" is meant the hydroxyl equivalents of the polyol. For example one mole of glycerol is three equivalents thereof, one mole of pentaerythritol is four equivalents thereof, and so forth. The phosphorylated polyols (acid esters) can be partially or completely converted to their corresponding alkali metal salts or ammonium salts by reacting with appropriate amounts of alkali metal hydroxides or ammonium hydroxide.

Water soluble organophosphornic acids applicable in the present invention have been previously disclosed in U.S. Pat. No. 3,214,454. These products can be produced, for example by reacting phosphorous acid with acid anhydrides and/or acid chlorides especially those of acetic, propionic, butyric, valeric, and caproic acid. In lieu of phosphorous acid and one of the acid anhydrides or chlorides named above, phosphorous trichloride can be reacted directly with one or a mixture of the carboxylic acids. The reactions are usually carried out at elevated temperatures, preferably between 50° C. and 200° C. These water-soluble organophosphonic acids are 1-hydroxyalkylidene-1,1-diphosphonic acids of the formula

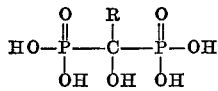

wherein R denotes an alkyl group having from 1 to 5 carbon atoms. Depending upon the process whereby they are manufactured, they may be obtained in pure form as represented by the above formula, or may also contain products having the above formula wherein the hydroxyl group is partially esterified. The acyl group, in that case, corresponds to the carboxylic acid component used in the reaction. Furthermore, two or more molecules of the above formula may convert into the corresponding intermolecular anhydrides while splitting off water, and thus may be present together with the compound conforming to the formula above.

Salts of the organophosphonic acids may also be used, and in these cases one or more of the hydrogens in the $PO(OH)_2$ groups in the above formula are replaced by metal cations, ammonium ions or ethanol ammonium ions. Examples of the metal cations include alkali metal, alkaline earth metal, zinc, cobalt, chromium, lead, tin and nickel ions. The organophosphonic acid salts can be obtained by reacting the organophosphonic acids with a sufficient quantity of the metal hydroxides, carbonates or bicarbonates, ammonium hydroxide, or mono-, di-, and triethanol amines.

Although organophosphonic acids and their salts as disclosed hereinbefore are applicable in this invention, especially good results were obtained with 1-hydroxyethylidene-1,1-diphosphonic acid (HEDPA commercially available under the tradename DEQUEST 2010) and its sodium salt.

The following examples illustrate specific embodiments of the present invention. In the examples and elsewhere herein parts and ratios are by weight. The amounts of inorganic polyphosphates and phosphorylated polyols disclosed in the examples and elsewhere herein are calculated as $PO_4$. The amounts of organophosphonic acid disclosed in the examples and elsewhere herein are calculated as the hydroxyalkylidenediphosphonic acid. The examples are not intended to limit the present invention beyond the scope of the appended claims.

heat-transfer section, and a water condenser, all of which were joined with plasticized polyvinyl chloride tubing. The heat-transfer section was comprised of an outer glass jacket and a mild steel tubular specimen into which a stainless steel cartridge heater was inserted. The test solution was pumped from the basin, through the pump, to the heat-transfer section where it flowed through the annular space between the tubular specimen and the glass jacket, and finally through the center of the condenser and back to the basin. The solution was constantly aerated by means of an air sparge in the basin. The flow rate was regulated from zero to 3 gal./min., and the temperature of the test solution was maintained at 55° C. ±1° C. by maintaining a constant heat output from the cartridge heater while providing cooling by passing tap water through the outer portion of the condenser. The flow rate of the tap water was regulated utilizing a thermoregulator in the basin. The tubular specimens were polished, degreased, and weighed prior to exposure, then inserted and exposed to the recirculating test solution for 20 hours; in each case, 15.7 in.² of metal surface area was exposed. After exposure, the tubes were removed, dried, weighed, then immersed in 5% sulfuric acid (containing an amine-based corrosion inhibitor) for 3 minutes at 70° C. to remove all scale and corrosion products, dried and reweighed. The difference between the original and final weights is referred to herein as the "weight loss" and is a measurement of the amount of corrosion that the tubular specimen underwent. The difference between the weight of the tubular specimen after exposure, before and after treatment with inhibited acid, is referred to herein as "scale deposition," and is a measurement of the amount of scale and corrosion products deposited onto the specimen.

In Examples 1–4 and all other examples herein the values (under "weight loss due to corrosion and weight gain due to scale deposition") in parentheses are the deposition data and the values not in parentheses are the corrosion data. Likewise in Examples 1–4 and all other examples herein both the apparatus and test procedures used are well known and widely used in this art.

EXAMPLES 1–6

Examples 1–6 compare the corrosion and scale deposition data of tubes exposed to test solutions containing either various inorganic polyphosphates or various phosphorylated polyols with and without a particular organophosphonic acid. Further details appear in Table I below.

TABLE I

| | P.p.m. additive | | Wt. loss due to corrosion and wt. gain due to scale deposition, mg. | | | | | | | | | |
|---|---|---|---|---|---|---|---|---|---|---|---|---|
| Example number | Polyphosphates as $PO_4$ | HEDPA[a] | TPPP[b] | STP[b] | Calgon TG[b] | PPM[b] | PPA[b] | PPE[c] | PG[c] | PEG[c] | PM[c] |
| 1 | 60 | 0 | 18 (33) | 23 (45) | 27 (78) | 33 (56) | 28 (44) | 85 (162) | | 101 (166) | 109 (178) |
| 2 | 60 | 10 | 10 (13) | 12 (21) | 21 (42) | 17 (36) | 14 (18) | 24 (52) | | 33 (55) | 35 (62) |
| 3 | 40 | 0 | 34 (66) | 111 (148) | 201 (140) | 230 (303) | | | 207 (330) | | |
| 4 | 40 | 10 | 25 (51) | 16 (14) | 32 (51) | 13 (19) | 18 (23) | 21 (59) | 18 (36) | | |

[a] HEDPA is 1-hydroxyethylidene-1,1-diphosphonic acid commercially available under the trade name Dequest 2010.
[b] Abbreviations used for inorganic polyphosphates are as follows: TPPP is tetrapotassium pyrophosphate; STP is sodium tripolyphosphate; Calgon TG is a trade name for a glassy sodium hexametaphosphate containing about 8% zinc; PPM is a polyphosphate mixture consisting of 67% Calgon TG and 33% STP; PPA is polyphosphoric acid (82%–86% $P_2O_5$).
[c] Abbreviations used for phosphorylated polyols are as follows: PPE is phosphorylated pentaerythritol; PG is phosphorylated glycerol; PEG is phosphorylated ethylene glycol; PM is phosphorylated mannitol. All were prepared by reacting 1.0 hydroxyl equivalent of the polyol with 1.0 molar equivalent of polyphosphoric acid, expressed as $P_2O_5$, at 70° C.–110° C. for 2–4 hours.
NOTE.—Example 5 was a control run without any additive, and the results were 915 (1,372). Example 6 was a run with 10 p.p.m. HEDPA as the only additive, and the results were 634 (929).

The procedure used for Examples 1–30 hereinafter was as follows.

Test solutions were prepared by adding the appropriate amount of inhibitor to be evaluated to 3000 ml. of a synthetic cooling water (distilled water to which was added 150 p.p.m. $CaCl_2 \cdot 2H_2O$, 50 p.p.m. $MgSO_4$, 65 p.p.m. $Al_2(SO_4)_3 \cdot 18H_2O$, 300 p.p.m. $Na_2SO_4$, 180 p.p.m. NaCl, and 10 p.p.m. NaF), then adjusted to pH 6.75 with NaOH. The test solution was added to the basin of a recirculating heat-transfer corrosion test loop that consisted primarily of a glass basin, a centrifugal pump, a

EXAMPLES 7–15

Examples 7 and 8 give the corrosion and scale deposition data of tubes exposed to test solutions containing an organophosphonic acid and a mixture of inorganic polyphosphates, respectively, while Example 9 shows the synergistic effect of the combination of the two components. Example 10 shows the benefit derived from 1-hydroxybutylidene-1,1-diphosphonic acid (HBDPA) in combination with the inorganic polyphosphates while Examples 11–15, for comparison, show that certain other additives contribute no substantial benefit. Further details appear in Table II below.

TABLE II

| Ex. No. | P.p.m. additive | Wt. loss due to corrosion, mg. | Wt. gain due to scale deposition, mg. |
|---|---|---|---|
| 7 | 10 HEDPA [a] | 634 | 929 |
| 8 | 50 PPM [b] | 230 | 275 |
| 9 | 50 PPM plus 10 HEDPA | 13 | 19 |
| 10 | 50 PPM plus 10 HBDPA [c] | 18 | 25 |
| 11 | 50 PPM plus 10 EDTA [d] | 359 | 400 |
| 12 | 50 PPM plus 10 citric acid [e] | 202 | 250 |
| 13 | 50 PPM plus 10 modified tannin [f] | 273 | 325 |
| 14 | 50 PPM plus 10 AMP [g] | 155 | 230 |
| 15 | 50 PPM plus 10 EDTPA [h] | 183 | 250 |

[a] HEDPA is 1-hydroxyethylidene-1,1-diphosphonic acid, and is commercially available under the trade name Dequest 2010.
[b] PPM is an inorganic polyphosphate mixture of 67% Calgon TG (a trade name for a glassy sodium hexametaphosphate containing about 8% zinc) and 33% sodium tripolyphosphate. In all examples concentration of p.p.m. is expressed as PO$_4$.
[c] HBDPA is 1-hydroxybutylidene-1,1-diphosphonic acid.
[d] EDTA is a chelant, namely ethylenediaminetetraacetic acid.
[e] Citric acid is a chelant.
[f] A commercially available modified tannin dispersant, Rayflo C, was employed.
[g] AMP is aminotri(methylenephosphonic acid), an aminophosphonic acid outside the scope of the present invention.
[h] EDTPA is ethylenediaminetetra (methylenephosphonic acid), an aminophosphonic acid outside the scope of the present invention.

EXAMPLES 16–30

Examples 16 and 20 note the corrosion and scale deposition data of tubes exposed to test solutions containing a particular phosphorylated polyol. Example 17 shows similar data for 1-hydroxyethylidene-1,1-diphosphonic acid (HEDPA), an organophosphonic acid of this invention, by itself. Examples 18 and 21–25 show the synergistic benefits of combining the two components, while Examples 19 and 26–30, for comparison, show no significant benefit for the addition of certain conventional additives. Further details appear in Table III below.

TABLE III

| Ex. No. | P.p.m. additive | Wt. loss, mg. | Scale deposition, mg. |
|---|---|---|---|
| 16 | 60 PPE [a] | 85 | 162 |
| 17 | 10 HEDPA [b] | 634 | 929 |
| 18 | 60 PPE plus 10 HEDPA | 25 | 52 |
| 19 | 60 PPE plus 10 AMP [c] | 80 | 162 |
| 20 | 50 PPE | 150 | 198 |
| 21 | 40 PPE plus 10 HEDPA | 28 | 37 |
| 22 | 40 PPE plus 10 HEDPA, zinc salt | 22 | 48 |
| 23 | 40 PPE plus 10 HEDPA, ethanolamine salt | 33 | 58 |
| 24 | 40 PPE plus 10 HEDPA, sodium salt | 25 | 40 |
| 25 | 40 PPE plus 10 HEDPA, ammonium salt | 32 | 45 |
| 26 | 40 PPE plus 10 EDTA [d] | 264 | |
| 27 | 40 PPE plus 10 sodium lignosulfonate [e] | 208 | |
| 28 | 40 PPE plus 10 modified tannin [f] | 205 | |
| 29 | 40 PPE plus 10 AMP | 140 | |
| 30 | 40 PPE plus 10 EDTPA [g] | 140 | |

[a] PPE is phosphorylated pentaerythritol.
[b] HEDPA is 1-hydroxyethylidene-1,1-diphosphonic acid, and is commercially available under the trade name Dequest 2010.
[c] AMP is aminotri(methylenephosephonic acid).
[d] EDTA is a chelant, namely ethylenediaminetetraacetic acid.
[e] A commercially available sodium lignosulfonate, Maracell E, was employed.
[f] A commercially available modified tannin dispersant Rayflo C, was employed.
[g] EDTPA is ethylenediaminetetra (methylenephosphonic acid).

Examples 31–36

The procedure used for Examples 31–36 hereinafter was as follows. The recirculating heat-transfer corrosion test loop employed for this test series was substantially the same as that described for Examples 1–30, except provision was made for periodic addition of fresh test solution to the basin (make-up), with simultaneous discharge (blowdown) of recirculating solution. An initial high-level dosage treatment (3.3 times that of the maintenance dosage) was employed for 24 hours followed by treatment at the maintenance level for the duration of the 14-day testing period. The corrosion rates in mils per year (m.p.y.) and scale deposition in milligrams per square centimeter (mg./cm.$^2$) of exposed surface area of the tubular mild steel specimens are given below for test solutions containing either phosphorylated pentaerythritol (PPE) or an inorganic polyphosphate (the amounts used being calculated as PO$_4$) with and without an organophosphonic acid of this invention.

TABLE IV

| Ex. No. | P.p.m. additive | Corrosion rate, m.p.y. | Scale deposition, mg./cm.$^2$ |
|---|---|---|---|
| 31 | 30 TPPP [a] | 1.3 | 2.2 |
| 32 | 20 TPPP plus 5.25 HEDPA [b] | 0.8 | 1.4 |
| 33 | 30 PPM [c] | 0.8 | 2.6 |
| 34 | 20 PPM plus 5.25 HEDPA | 0.8 | 1.6 |
| 35 | 30 PPE [d] | 2.3 | 5.0 |
| 36 | 20 PPE plus 5 HEDPA | 0.8 | 0.9 |

[a] TPPP is tetrapotassium pyrophosphate.
[b] HEDPA is 1-hydroxyethylidene-1, 1-diphosphonic acid.
[c] PPM is an inorganic polyphosphate mixture of 67% Calgon TG (a trade name for a glassy sodium hexametaphosphate containing about 8% zinc) and 33% sodium tripolyphosphate. In all examples concentration of p.p.m. is expressed as PO$_4$.
[d] PPE is phosphorylated pentaerythritol.

In Examples 31–36 above the addition to the synthetic cooling water of the combination of HEDPA and the inorganic polyphosphates and PPE was effected by first preparing concentrated solutions in water of the components, then diluting a portion of these solutions to a level of 1%–2% in water, and adding the required amount of the dilute solutions to the synthetic cooling water to provide test solutions with additives at the desired levels.

In Example 32 the concentrate of TPPP and HEDPA containing 34% of TPPP (20% as PO$_4$), 5.25% HEDPA and 60.75% water was prepared by mixing 34 parts of solid TPPP with 8.8 parts of 60% HEDPA water solution, and 57.2 parts of water. This concentrate was homogeneous and stable to storage when used more than 3 months after preparation. A portion of this concentrate was diluted to a total solids level of 2.0% by adding 5.0 parts to 93 parts of water. The test solution containing 66 p.p.m. TPPP as PO$_4$ and 17.3 p.p.m. HEDPA was prepared by adding 1 part of this diluted solution to 154 parts of the synthetic cooling water. The test solution containing 20 p.p.m. TPPP and 5.25 p.p.m. HEDPA was prepared by adding 1 part of the diluted solution to 510 parts of the synthetic cooling water.

Similarly in Example 34 a concentrate of PPM and HEDPA containing 5% total solids was prepared by mixing 2.8 parts Calgon TG, 1.4 parts sodium tripolyphosphate, and 1.5 parts of 60% water solution of HEDPA with 94.3 parts of water. This concentrate was homogeneous. A portion of this solution was diluted to 1% solids by adding 20 parts to 80 parts of water. A test solution containing 66 p.p.m. PPM as PO$_4$ and 17.3 p.p.m. HEDPA was prepared by adding 1 part of this diluted solution to 103 parts of the synthetic cooling water. The test solution containing 20 p.p.m. PPM and 5.25 p.p.m. HEDPA was prepared by adding 1 part of the diluted solution to 342 parts of the synthetic cooling water.

In Example 36 in preparing the concentrate of PPE and HEDPA, the acids were partially neutralized with sodium hydroxide to increase the storage stability. First, 14.5 parts of sodium hydroxide was dissolved in 50.9 parts of water. Then, 9.6 parts of 60% HEDPA was added followed by 25 parts of PPE (23 parts as PO$_4$), a viscous liquid with 91% PO$_4$ content. This concentrate had a pH of 5, was homogeneous, and was stable to storage for over three weeks. A portion of this concentrate was diluted to 1% solids content by mixing 1 part with 44.5 parts of water. The test solutions containing 66 p.p.m. PPE as PO$_4$ and 17.3 p.p.m. HEDPA and containing 20 p.p.m. PPE and 5.25 p.p.m. HEDPA were prepared by adding single parts of the 1% solids solution to 72.5 parts and 240 parts respectively of the synthetic cooling water.

EXAMPLE 37

Mild steel coupons were exposed initially for 24 hours to 2 l. of an aerated tap water containing 100–120 p.p.m. hardness, as CaCO$_3$, to which 50 mg./l. phosphorylated glycerol and 10 mg./l. 1-hydroxyethylidene-1,1-diphosphonic acid (HEDPA) had been added. Thereupon, 50 ml. of fresh tap water containing 10 mg./l. phosphorylated glycerine and 2 mg./l. HEDPA was added to the test solution once every 22.5 minutes (64 additions per day) displacing 50 ml. of the test solution to the drain. After 10 days exposure, the coupons remained virtually free of visible corrosion and scale.

EXAMPLE 38

A concentrate of phosphorylated glycerol (PG), 95% $PO_4$ content, and HEDPA was prepared by adding 10 parts of 60% HEDPA and 31.5 parts PG (30 parts as $PO_4$) successively to a solution of 18 parts NaOH in 40.5 parts of water. A portion of this 55.5% solids concentrate was subsequently diluted to 1% concentration by addition of 1 part to 54.5 parts of water. Mild steel coupons were exposed initially for 24 hours, in the recirculating corrosion test loop employed for Examples 31–36, to 2 liters of aerated tap water containing 102 p.p.m. hardness as $CaCO_3$ to which 18.5 ml. of the diluted corrosion inhibitor had been added. This dilution provided a concentration of 50 p.p.m. PG as $PO_4$ and 10 p.p.m. HEDPA in the test solution. After 24 hours, 50 ml. of fresh tap water containing 10 p.p.m. PG as $PO_4$ and 2 p.p.m. HEDPA (addition of 1 part of the 1% solution to 540 parts of tap water) was added to the circulating loop each 22.5 minutes displacing an equal amount of the test solution which was drained off (64 additions per day). After ten days of this exposure, the test coupons remained virtually free of visible corrosion and scale.

EXAMPLE 39

A composition of this invention was evaluated in an open recirculating cooling system operating at 1,400 g.p.m. with a 6° C. temperature drop through the system. Creek water was used as makeup (about 10 g.p.m.) to maintain the recirculating water at 5–6 cycles of concentration. The latter contained about 150 p.p.m. hardness as $CaCO_3$ and 3300 p.p.m. total dissolved solids with pH controlled at 6–7 with $H_2SO_4$.

A concentrate, containing 16% phosphorylated ethylene glycol (PEG, 15% as $PO_4$), 15% HEDPA, 13.8% caustic, and the remainder water, was diluted in a chemical feed tank (1 pint concentrate per gallon tap water), then pumped continuously by a proportionate feed pump at the rate of about 8 mls. per minute to the cooling tower basin in order to maintain a residual level of 100 p.p.m. of the original concentrate in the system. Treatment was continued for about 3 months at which time a heat exchanger was opened for inspection. The exchanger was found to be generally free of corrosion products and only contained small amounts of deposition in the areas of U-bends.

The amount of inorganic polyphosphate is not critical and may vary widely, depending primarily on the severity of the corrosion and scale deposition problems. Maintenance dosages of inorganic polyphosphate of about 1–200 p.p.m., preferably about 5–100 p.p.m, and most desirably about 10–60 p.p.m., by weight are used, calculated as $PO_4$.

The amount of phosphorylated polyol is not critical and may vary widely depending primarily on the severity of the corrosion and scale deposition problems. Maintenance dosages of phosphorylated polyol of about 1–200 p.p.m., preferably about 5–100 p.p.m., and most desirably about 10–60 p.p.m., by weight are used, calculated as $PO_4$.

The amount of organophosphonic acid (calculated as the hydroxyalkylidenediphosphonic acid) is not critical and may vary widely depending primarily on the amount of inorganic polyphosphate or phosphorylated polyol used. Maintenance dosages of organophosphonic acid (solids basis) of about 0.5–50 p.p.m., preferably about 2–10 p.p.m., are used.

The phosphorylated polyols and polyphosphoric acids are usually extremely viscous liquids at room temperature. These materials may be diluted with water and partially or completely neutralized with an alkali metal or ammonium base to provide a less viscous solution (e.g. 25%–50%) for easier handling.

The inorganic polyphosphates are normally solids which are water soluble. Readily pumpable low viscosity water solutions of 1%–25% concentration can be prepared for easy handling.

The organophosphonic acids are usually available as 25%–75% aqueous solutions. These may be added directly to the cooling water system but it is generally desirable to first dilute the organophosphonic acids with water in a chemical feed tank before adding the recirculating water. Dilution to 1%–10% at this stage is typical.

It is often preferable to incorporate both the polyphosphate and the organophosphonic acid into one diluted aqueous blend which is then added to the circulating water system. A mixture has the obvious advantages of insuring use of a predetermined polyphosphate/organophosphate ratio, as well as requiring less manual attention and equipment.

While these materials may be introduced into the circulating water system periodically (either separately or in combination), it is preferable that they be introduced continuously thus maintaining the concentrations at a uniform desired level.

For convenience in shipping, storage, and dilution, and to insure maintenance of the desired proportions of the polyphosphate and organophosphonic acid components it is often desirable to prepare concentrates of the components in the proportions to be employed. Thus, addition of a single additive solution, with or without further dilution with water, is possible. Such concentrates can be prepared using as the solvent and viscosity reducer either water or lower alcohols including methanol, ethanol, isopropanol, butanol, or a combination of water and lower alcohol. The amount of (1) water, (2) organophosphonic acid, and (3) inorganic polyphosphate or phosphorylated polyol are not critical and may vary widely and still give the desired compatability, storage stability, and low enough viscosity for ease of pouring or pumping. Amounts of these components are given herein as percent by weight of the 3-component mixture forming the concentrate.

The amount of water in the concentrate is about 5%–99%, the minimum amount of water being more important than the maximum amount. Preferably the minimum amount of water is about 40%–70%. Except from a practical standpoint the only limitation on the maximum amount of water is the amount in the system after adding the concentrate to the water being conditioned, however this amount is in excess of the maximum practical amount for use in the concentrate.

The amount of inorganic polyphosphate (solids basis) or phosphorylated polyol (water free basis) in the concentrate is about 1%–80%, preferably about 1%–50% for each.

The amount of organophosphonic acid (solids basis) in the concentrate is about 1%–30%, preferably about 1%–15%.

This invention is applicable to all ferrous metals, subject to corrosion and/or scale deposition in circulating water systems. These metals include, e.g. mild steel, cast iron, stainless steel, and other alloys containing iron.

The synergistic relationship between the water soluble organophosphonic acids and the water soluble polyphosphates (i.e. the inorganic polyphosphates and the phosphorylated polyols) disclosed herein for the reduction of corrosion and scale deposition on metal surfaces offers several advantages over the prior art practice of using the polyphosphates alone. In cooling water systems where either an inorganic polyphosphate or a phosphorylated polyol has been employed as a corrosion inhibitor, the additional use of the organophosphonic acids described herein will lower the corrosion rates (thereby increasing equipment life) and substantially reduce further scale deposition (thereby providing greater heat exchanger efficiencies and preventing losses in heat transfer ability). The combined use of both components (i.e. polyphosphates and organophosphonic acid) enables the dosage required to maintain a given corrosion rate and scale deposition rate to be lower for the polyphosphate than is possible in the absence of the organophosphonic acid. This has obvious advantages since the polyphosphate can serve as a nutrient for algae and as a source of phosphate sludge.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Method of conditioning circulating water to reduce the corrosive attack and scale accumulation on metal surfaces which the water contacts which comprises introducing into said water a water soluble polyphosphate and a water soluble organophosphonic acid, said polyphosphate being from the following:
   (1) an inorganic polyphosphate having a molar ratio of at least one of alkali metal oxide, alkaline earth metal oxide, zinc oxide to $P_2O_5$ of about 0.4/1–2/1, and their corresponding acids having a molar ratio of water to $P_2O_5$ of about 0.4/1–2/1,
   (2) a polyfunctional acid phosphate ester of a polyhydric alcohol, said ester having the formula

wherein R is the hydrocarbyl group of a polyhydric alcohol and $x$ is a number from 2 to 6,
said organophosphonic acid being a 1-hydroxyalkylidene-1,1-diphosphonic acid of the formula:

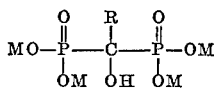

wherein R is an alkyl group having 1–5 carbon atoms and M is hydrogen, a metal cation, an ammonium ion, or an ethanol ammonium ion.

2. Method of claim 1 wherein said polyphosphate is an inorganic polyphosphate having a molar ratio of at least one of alkali metal oxide, alkaline earth metal oxide, zinc oxide to $P_2O_5$ of about 0.4/1–2/1, and their corresponding acids having a molar ratio of water to $P_2O_5$ of about 0.4/1–2/1.

3. Method of claim 1 wherein said polyphosphate is a polyfunctional acid phosphate ester of a polyhydric alcohol, said ester having the formula $R\text{--}(OPO_3H_2)_x$ wherein R is the hydrocarbyl group of a polyhydric alcohol and $x$ is a number from 2 to 6.

4. Method of claim 1 wherein the amount of said inorganic polyphosphate (calculated as $PO_4$) or the amount of said polyfunctional acid phosphate ester (calculated as $PO_4$) is about 1–200 parts per million.

5. Method of claim 1 wherein the amount of said inorganic polyphosphate (calculated as $PO_4$) or the amount of said polyfunctional acid phosphate ester (calculated as $PO_4$) is about 10–60 parts per million.

6. Method of claim 1 wherein the amount of organophosphonic acid or its salts (calculated as the 1-hydroxyalkylidene-1,1-diphosphonic acid) by weight of the water being conditioned is about 0.5–50 parts per million.

7. Method of claim 1 wherein the amount of said organophosphonic acid or its salts (calculated as the 1-hydroxyalkylidene-1,1-diphosphonic acid) by weight of the water being conditioned is about 2–10 parts per million.

8. A water conditioning composition comprising water, a water soluble polyphosphate and a water soluble organophosphonic acid, said polyphosphate being from the following:
   (1) an inorganic polyphosphate having a molar ratio of at least one of alkali metal oxide, alkaline earth metal oxide, zinc oxide to $P_2O_5$ of about 0.4/1–2/1 and their corresponding acids having a molar ratio of water to $P_2O_5$ of about 0.4/1–2/1,
   (2) a polyfunctional acid phosphate ester of a polyhydric alcohol, said ester having the formula

wherein R is the hydrocarbyl group of a polyhydric alcohol and $x$ is a number from 2 to 6,
said organophosphonic acid being a 1-hydroxyalkylidene-1,1-diphosphonic acid of the formula:

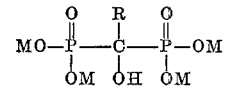

wherein R is an alkyl group having 1–5 carbon atoms and M is hydrogen, a metal cation, an ammonium ion, or an ethanol ammonium ion.

9. Composition of claim 8 wherein said polyphosphate is an inorganic polyphosphate having a molar ratio of at least one of alkali metal oxide, alkaline earth metal oxide, zinc oxide to $P_2O_5$ of about 0.4/1–2/1, and their corresponding acids having a molar ratio of water to $P_2O_5$ of about 0.4/1–2/1.

10. Composition of claim 8 wherein said polyphosphate is a polyfunctional acid phosphate ester of a polyhydric alcohol, said ester having the formula

wherein R is the hydrocarbyl group of a polyhydric alcohol and $x$ is a number from 2 to 6.

11. Composition of claim 8 wherein the amount of said inorganic polyphosphate (calculated as $PO_4$) or the amount of said polyfunctional acid ester (calculated as $PO_4$) is sufficient to produce a concentration of either of about 1–200 parts per million by weight when said composition is added to water being conditioned, and wherein the amount of said organophosphonic acid or its salts (calculated as the 1-hydroxyalkylidene-1,1-diphosphonic acid) is sufficient to produce a concentration thereof of about 0.5–50 parts per million by weight on a solids basis when said composition is added to water being conditioned.

12. Composition of claim 8 wherein the amount of said inorganic polyphosphate (calculated as $PO_4$) or the amount of said polyfunctional acid ester (calculated as $PO_4$) is sufficient to produce a concentration of either of about 10–60 parts per million by weight when said composition is added to water being conditioned, and wherein the amount of said organophosphonic acid or its salts (calculated as the 1-hydroxyalkylidene-1,1-diphosphonic acid) is sufficient to produce a concentration thereof of about 2–10 parts per million by weight on a solids basis when said composition is added to water being conditioned.

References Cited

UNITED STATES PATENTS

| | | | |
|---|---|---|---|
| 3,634,257 | 1/1972 | Porter et al. | 252—181 X |
| 3,668,094 | 6/1972 | Hatch | 252—181 X |
| 3,668,132 | 6/1972 | Finder | 252—80 |
| 3,671,448 | 6/1972 | Kowalski | 252—181 X |
| 3,214,454 | 10/1965 | Blaser et al. | 252—180 X |
| 3,451,939 | 6/1969 | Ralston | 252—181 |
| 3,099,521 | 7/1963 | Arensberg | 252—181 |
| 3,483,925 | 12/1969 | Slyker | 252—80 UX |

NORMAN G. TORCHIN, Primary Examiner

J. R. MILLER, Assistant Examiner

U.S. Cl. X.R.

21—2.7; 210—58; 252—80, 87, 180